United States Patent
Gallehawk (10) Patent No.: US 11,623,385 B2
(45) Date of Patent: Apr. 11, 2023

(54) POLYMER FABRICATION METHODS

(71) Applicant: CONSTRUCTION SERVICES QUEENSLAND PTY LTD, Drayton (AU)

(72) Inventor: Stephen Mark Gallehawk, Middle Ridge (AU)

(73) Assignee: CONSTRUCTION SERVICES QUEENSLAND PTY LTD, Drayton (AU)

( * ) Notice: Subject to any disclaimer, the term of this patent is extended or adjusted under 35 U.S.C. 154(b) by 0 days.

(21) Appl. No.: 16/639,376

(22) PCT Filed: Aug. 17, 2018

(86) PCT No.: PCT/AU2018/050877
§ 371 (c)(1),
(2) Date: Feb. 14, 2020

(87) PCT Pub. No.: WO2019/033174
PCT Pub. Date: Feb. 21, 2019

(65) Prior Publication Data
US 2020/0254678 A1    Aug. 13, 2020

(30) Foreign Application Priority Data
Aug. 17, 2017   (AU) ................................ 2017903304

(51) Int. Cl.
*B29C 53/06*   (2006.01)
*B29C 65/12*   (2006.01)
(Continued)

(52) U.S. Cl.
CPC ............ *B29C 53/066* (2013.01); *B29C 65/12* (2013.01); *B29C 66/02241* (2013.01);
(Continued)

(58) Field of Classification Search
CPC .................. B29C 53/066; B29C 65/12; B29C 66/02241; B29C 66/322; B29C 66/431;
(Continued)

(56) References Cited

U.S. PATENT DOCUMENTS

| 5,820,718 A | 10/1998 | Dean |
| 2004/0194874 A1* | 10/2004 | Newberry ............ A47B 47/042 156/196 |

(Continued)

FOREIGN PATENT DOCUMENTS

| DE | 102014112293 A1 * | 3/2016 | ............... B27C 5/00 |
| EP | 2090710 A1 | 8/2008 | |

(Continued)

OTHER PUBLICATIONS

Ineos, Engineering Properties of High Density Polyethylene, Jan. 2007. (Year: 2007).*

(Continued)

*Primary Examiner* — Michael N Orlando
*Assistant Examiner* — Christopher W Raimund
(74) *Attorney, Agent, or Firm* — WCF IP (57) ABSTRACT

There is provided a polymer fabrication method for forming 3-dimensional shapes from a sheet polymer blank (10) by machining at least one re-entrant, elongate groove forming a reduced thickness portion (25) permitting the blank to be folded and having opposed edges (12) at the surface, folding the blank about the groove to form at least a portion of the 3-dimensional shape, the re-entrant of the groove forming an elongate chamber (21) adjacent the reduced thickness portion and opening through an elongate gap (20) between the opposed edges, hot air welding the opposed edges across the gap with filler rod (22), and heating the reduced thickness portion to a selected thermo-reforming temperature via the chamber.

22 Claims, 7 Drawing Sheets

(51) Int. Cl.
  *B29C 65/00* (2006.01)
  *B29K 23/00* (2006.01)
  *B29K 267/00* (2006.01)
  *B29L 12/00* (2006.01)

(52) U.S. Cl.
  CPC .......... *B29C 66/322* (2013.01); *B29C 66/431* (2013.01); *B29C 66/71* (2013.01); *B29C 66/73774* (2013.01); *B29C 66/73921* (2013.01); *B29K 2023/065* (2013.01); *B29K 2023/12* (2013.01); *B29K 2267/003* (2013.01); *B29K 2995/0041* (2013.01); *B29L 2012/00* (2013.01)

(58) Field of Classification Search
  CPC .............. B29C 66/71; B29C 66/73774; B29C 66/73921; B29C 66/91641; B29C 66/91431; B29C 66/93441; B29C 66/872; B29C 66/961; B29C 66/919; B29C 66/9121; B29C 66/91212; B29C 65/125; B29C 66/0242; B29C 66/863; B29C 66/4326; B29C 66/836; B29K 2023/065; B29K 2023/12; B29K 2267/003; B29K 2995/0041; B29L 2012/00; B29L 2031/003; B23K 35/3613; B23K 35/26; B23K 20/023; B23K 2103/42
  See application file for complete search history.

(56) References Cited

U.S. PATENT DOCUMENTS

2011/0056014 A1* 3/2011 Wilkinson ............... A47K 3/30
  4/613
2018/0319096 A1* 11/2018 Dobbyn .............. B29C 66/9121

FOREIGN PATENT DOCUMENTS

EP      2700583 A1 *  2/2014  .......... B65D 5/4266
WO   2008/146031 A1   12/2008

OTHER PUBLICATIONS

Vycom Fabrication Manual, HDPE Material, 2013, https://www.curbellplastics.com/Research-Solutions/Technical-Resources/Technical-Resources/Vycom-HDPE-Fabrication-Manual. (Year: 2013).*

Kopte et al., "Programmable Logic Controller and Its Applications", Intl. Journal of Eng. Res. And Gen. Sci., vol. 3, Issue 5, pp. 1010-1014, Sep.-Oct. 2015. (Year: 2015).*

* cited by examiner

POLYMER FABRICATION METHODS

FIELD OF THE INVENTION

This invention relates to polymer fabrication methods. This invention has particular application to forming crystalline thermopolymer products such as HDPE door and other frames and fittings for use in installations such as hospital, cold room and other sterile, food preparation and wet areas, and the invention will be further described with reference to these applications. However, it is envisaged that this invention will find wider application in fabricated crystalline plastic (e.g HDPE, PET and PP) components.

BACKGROUND OF THE INVENTION

The reference to any prior art in this specification is not, and should not be taken as, an acknowledgement or any form of suggestion that the referenced prior art forms part of the common general knowledge in Australia.

In the context of polymer products "crystalline polymers" are thermoplastic polymers having a percentage of crystalline morphology in concert with amorphous regions and are technically semicrystalline in nature. While not strictly analogous to fatigue in metal, plastic components when machined to thin sections and then formed into structures by bending may suffer from cracking failure at the bends.

There is a need for substantially impervious fixtures and surfaces in built environments such as hospitals, cold rooms and food preparation areas. Large surfaces such as walls may be sheeted in thermopolymer sheet including HDPE sheet. However, fitted components such as door frames are not generally formed of HDPE because of the inherent difficulty of fabrications compared with, for example, the more expensive polypropylene (PP).

Metal door frames, despite being the best option currently available, are inadequately suited to the needs of many hospitals and food preparation facilities. The metal frames rust, promoting contamination. The corrosion risk is substantially increased in wet areas (such as cold rooms in food preparation facilities), which is exacerbated by the fact that the frames themselves prevent the installation of proper waterproofing. Since metal door frames are necessarily fitted at the time of stud framing, waterproofing behind them is impossible.

Metal door frames are further required to be painted, making them susceptible to chips by carts, trolleys or other such common devices. Paint chips allow entry to microorganisms under the paint, as well as being a hazard themselves through the risk of contaminants entering food products or open wounds.

Furthermore, the options for retrofitting metal door frames are time consuming and costly. A hole much larger than the doorway must be cut into the wall, necessitating the rest of the wall to be re-sheeted, re-set and re-painted. This work takes time (often several days) and is expensive, despite the relatively cheap cost of the frames themselves. The length of such intrusive installations is particularly unsuited to hospitals and food preparation facilities, where paint fumes, plaster dust and other such unavoidable debris are impermissible.

The use of fabricated polymer door frames has obvious benefits. However, HDPE is affected by environmental stress cracking (ESC) when it is subjected to external or internal stress in the presence of polar liquids or vapours. ESC can also be caused by detergents or silicone fluids as well as many other agents. PP is far less affected by ESC than HDPE. HDPE has good dynamic fatigue resistance but not as good as PP and exhibits no living hinge effect. Compared to PP homopolymer, HDPE has better resistance to low temperature impact and to oxidation. The surface gloss on products can be similar for either polymer. HDPE is not attacked by concentrated salts, acids or alkalis at room temperature and resists some oxidising agents such as hypochlorites.

It is clear that there are many engineering advantages to the use of expensive PP for machining, folding and thermally welding shaped structures such as door frame sections. There are equally some inherent characteristics of HDPE that would render the material useful were it not the ESC problem and the lack of "living hinge" performance on folding machined sheet to shape. It is thus an object of the present invention to provide at least one high density polyethylene fabrication method which substantially ameliorates the cracking problem of HDPE when used for machined, folded and thermally welded shaped structures.

SUMMARY OF THE INVENTION

In one aspect the present invention resides broadly in a polymer fabrication method including the steps of:
  providing a sheet polymer blank of selected thickness and of shape selected corresponding to a selected 3-dimensional shape;
  machining at least one re-entrant, elongate groove across a surface of said blank, said groove forming a reduced thickness portion permitting said blank to be folded and having opposed edges at said surface;
  folding said blank about said groove to form at least a portion of said 3-dimensional shape, the re-entrant of said groove forming an elongate chamber adjacent said reduced thickness portion and opening through an elongate gap between said opposed edges;
  hot air welding said opposed edges across said gap with filler rod; and
  heating said reduced thickness portion to a selected thermo-reforming temperature via said chamber.

Non-exhaustive examples of suitable polymers are crystalline polymers including HDPE, PP and PET. The degree of crystallinity may vary and the propensity for cracking is not necessarily in linear correlation with the crystalline content of the polymer. Heating the reduced thickness portion may effect thermo-reforming by any one or more of partial remelting, annealing and recrystallization of the polymer sufficient to reinstate the integrity of the polymer matrix.

The heating of the reduced thickness portion may comprise hot air, radiant or contact heating means. The presence of the chamber admits of heating means operating transverse the axis of the chamber such as through said elongate gap. Alternatively, the heating means may be drawn along the chamber ahead of the advance of the hot air welding zone. The heating means may comprise utilizing waste heat from the hot air welding process.

The thermo-reforming process may be controlled by calibration against the temperature and speed of the welding process. The thermo-reforming may be controlled as to temperature and time in response to appropriate sensors, such as temperature sensors directly or indirectly responsive to the thermo-reforming temperature of the polymer. The thermo-reforming temperature appropriate to the polymer in situ is dependent on the type of polymer, the degree of crystallinity and the working history of the section.

In a further aspect the present invention resides broadly in an HDPE fabrication method including the steps of:

provided a sheet HDPE blank of selected thickness and of shape selected corresponding to a selected 3-dimensional shape;

machining at least one re-entrant, elongate groove across a surface of said blank, said groove forming a reduced thickness portion permitting said blank to be folded and having opposed edges at said surface;

folding said blank about said groove to form at least a portion of said 3-dimensional shape, the re-entrant of said groove forming an elongate chamber adjacent said reduced thickness portion and opening through an elongate gap between said opposed edges;

hot air welding said opposed edges across said gap with filler rod whereby welding exhaust air passes into said chamber and heats said reduced thickness portion to a selected thermo-reforming temperature.

The sheet HDPE blank may be of any suitable HDPE grade for the intended application. Typically, HDPE sheet is of density of 0.940 to 0.965 g/cm³, with higher density correlating with higher crystallinity, in turn providing higher rigidity, tensile strength, hardness, melting point, heat distortion temperature, chemical resistance, viscosity and resistance to permeation. However, increasing crystallinity results in lower clarity and impact strength, and increasing tendency to stress cracking. Typically, common commercial grades of high-density polyethylene have a melting point in the range of about 130 to 180° C.

The thickness and shape is determined by the nature of the end product and will be described hereinafter with reference to a door frame. In this case the 3-dimensional shape may comprise a unitary door frame section comprising a door jamb portion bounded by a pair of spaced, integral architrave portions.

The at least one re-entrant, elongate groove may be of any suitable cross section consistent with the purpose of forming the elongate chamber on folding of the sheet. For example, an ovoid cross section may approximate a substantially part-circular cross sectioned elongate chamber on folding of the sheet.

The depth of the groove is selected having regard to the residual thickness necessary to leave to provide in-use structural strength and resistance to impact damage while being foldable. In practice, a door frame made from 10 mm sheet may be machined to form a groove leaving a residual material thickness of from about 1.5 mm to about 3.0 mm, and typically about 2 mm.

The groove may be formed by any suitable means including but not limited to CNC router.

The folding of the blank about the groove to form at least a portion of the 3-dimensional shape is preferably done in a single pass and the shape retained by a jig or the like. The nature of the material is that repeated self-hinging is to be avoided as cracking is highly likely. The groove is chosen to present an elongate gap opening the elongate chamber to the atmosphere on folding. The gap may be any width consistent with bridging by hot air welding using filler rod while admitting hot air to the chamber to heat the HDPE at the fold. However, in practice it has been found that there is a correlation between a desirable gap width and the residual thickness that is somewhat independent of the absolute shape and dimension of the elongate chamber. It has been found that a 2 mm gap works well to admit thermal-conditioning air to the chamber to treat a residual HDPE thickness of about 2 mm. Within practical limits (such as so thin to be instantly melted and so thick as to be defeated by the low thermal conductivity of HDPE such as >6 mm), the relationship appears to be substantially linear.

The hot air welding method may comprise freehand welding, where a jet of hot air (or inert gas) from the welder is played on the weld area and the tip of a weld rod at the same time. As the rod softens, it is pushed into the joint and fuses to the parts. The welding exhaust air passes into said chamber and heats the reduced thickness portion to the selected thermo-reforming temperature.

For control and consistency of hot air flow into the chamber, speed welding may be preferred. In this embodiment a metal head fitted on a hot air welding tool has a feed tube for a plastic weld rod. The metal head heats the rod and the substrate, while at the same time the melting weld rod is pressed into position. A consistent bypass of hot air may pass into the elongate chamber and heats the reduced thickness portion to the selected thermo-reforming temperature.

Figure 8:
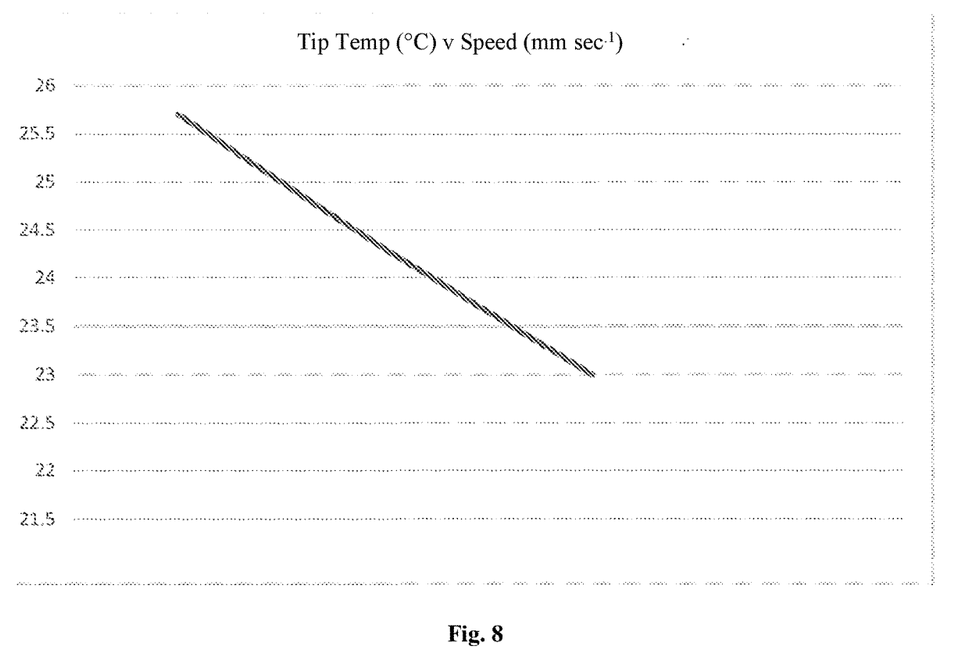
FIG. 8 is a graph showing the relationship between a polymer welding tip's temperature and welding speed.

For example, in case of HDPE, the suitable polymer welding tip temperature varies substantially linearly with welding speed, as shown in FIG. 8.

The speed and tip temperature may therefore be manipulated to achieve a selected thermo-reforming temperature delivered by welding exhaust air and will be selected having regard to the grade of HDPE being used. For example, higher crystallinity grades of HDPE have by their nature a melting point at the higher end of the scale of 130 to 180° C. The notional melting point is (the applicant has determined) slightly increased in regions of cold working such as the bend in the reduced-thickness portion. In these examples, the thermo-reforming effect may require that the HDPE be heated to between about 171 and about 182° C. in order to de-stress it and avoid later cracking. A temperature much in excess of 182 degrees C. may result in unacceptable surface deformation as the material begins to melt. Temperatures below 171° C. require a long dwell time that may disrupt the welding process closing the elongate gap.

Where the product of the process is a door frame, the HDPE 3-dimensional shape produced by the method may be preconfigured by machining and cutting while in the sheet form with features such as one or more of hinge rebates, striker plate rebates, corner mitres or the like. The folded sections may be post-configured with machined spline-receiving corner grooves and/or insertable metal right-angle joiners adapted to engage the ends of the elongate chamber and so mitre-join the upright portions with the head portion of the door frame.

The methods of the present invention may be adapted to a robotic process. For example, an at least three axis robotic machine such as a modified flatbed CNC machine may be used. For added versatility, more complex manipulation may be advanced by the use of, e.g., a 6-axis robotic arm.

In robotic applications the machined job blank may be loaded into a mechanical bender which bends the blank into the final shape. The PLC of the welding robot may be informed e.g. via a touch screen of the width of the blank so that the robot can weld both sides of the job with certainty of position. The robotic arm may be activated in automatic mode and proceeds to perform a sensing run over the blank to determine the length of the blank and the required weld length. This sensing may be performed by e.g. an ultrasonic distance sensor.

The hot air welding may be performed by a PLC-controlled robotic process including a PLC-controlled polymer welding rod feeder and a PLC-controlled air heating unit supplying hot air to the welding tip, and responsive to at least a temperature sensor associated with the welding tip. Air flow may be monitored to ensure heater shut-off if the air fails, thus avoiding burnout. The monitor may comprise a substantially vertical tube confining a gravity ball lifted by air pressure in the tube to contact a microswitch switch at the top of the tube and trigger an on signal from the PLC to the air heating unit, and an off signal if air flow drops and the ball falls away from the switch to de-activate the heating unit.

The opening of the microswitch preferably triggers welding shut-off on air failure, such as by shutting off the PLC-controlled polymer rod feeder.

The PLC monitors that the temperature (by measuring a thermocouple comprising the sensor at the welding tip) that the air temperature has reached the set point for starting the weld starting before energizing the robot arm. The set point may be different for different types or colours of plastic and typically covers a range from 250 to 300 degrees Celsius.

When the temperature set point has been reached, the robot may proceed to weld the first side of the job. The program may monitor the heat developed at the tip (via the thermocouple sensor) at selected increments such as about 10 mm along the weld and may continually adjust weld speed though a, for example, four-speed range. By using the result from the thermocouple sensor at the weld tip, the program may also continually adjust the heat setting in the microprocessor air heating unit, to maintain a temperature set point at the tip as constant as is possible.

Air is supplied to the microprocessor air heating unit by any suitable means. The action of crowding the weld tip while welding interferes with the air supply and delivers a non-constant air supply, which in turn cavitates air effecting the heat source, or supplies too much or not enough air at the tip and adversely alters the weld temperature. Accordingly, it is preferred that the PLC regulate parameters such as one or more of rod feed speed, speed of advance, air temperature and air pressure. The PLC may adjust the feed speed of the weld rod via a stepper or servo motor feed unit in direct proportion to the weld speed of the robot arm.

As the length of the blank is known by the PLC, the weld rod may be severed, for example, about 200 mm from the end of the weld run and the remaining weld rod allowed to run out aligning the end of the weld rod with the end of the blank. This ensures that the weld rod feeder tube is empty until ready to begin the following weld. If the weld rod was occupying the weld rod feeder tube, the heat developed at the tip would melt the weld rod and foul the end of the weld top and feeder tube.

The robot arm is articulated to move to the opposite side of the blank to weld the second weld, on refeeding weld rod into the tip.

In a further aspect the present invention resides in a polymer welding robot apparatus including:
- a welding tip which receives polymer rod from a PLC-controlled feeder and is air heated by a PLC-controlled air heating unit;
- a temperature sensor connected to said PLC and associated with said welding tip; and
- an air flow monitor comprising a substantially vertical tube confining a gravity ball lifted by air pressure in the tube to contact a microswitch switch at the top of the tube and trigger an on signal from the PLC to a heating element of the air heating unit, and an off signal if air flow drops and the ball falls away from the switch to de-activate the heating element and PLC-controlled feeder.

In a yet further aspect the invention resides broadly in a door frame assembly including a pair of door frame upright members and a door frame header member, each comprising a jamb portion bounded by integral architrave portions and formed from a sheet HDPE blank of selected thickness, said jamb portion and architrave portions being formed about respective re-entrant, elongate grooves across a surface of said blank, said groove forming a reduced thickness portion of said blank permitting said blank to be folded to form said door frame members, the re-entrant of said groove forming an elongate chamber adjacent said reduced thickness portion and opening through an elongate gap between said opposed edges, said elongate gap being closed by hot air welding said opposed edges across said gap with filler rod, welding exhaust air passing into said chamber to heat said reduced thickness portion to a selected thermo-reforming temperature.

The jamb portions may be configured with a door stop arrangement. For example, a machined groove may be adapted to receive as door stop assembly having a stop portion and a key portion locating in the groove. The key portion may be screw fixed into the groove with hidden fastenings driven in from the back of the jamb portions. The key portion may comprise an elongate key member of generally T-section and adapted to engaged with a corresponding T-shaped slot milled into the back of a stop batten member. The stop batten may be invisibly secured to the jamb portion by screw fixing into the key member from behind the jamb portion.

The door frame may be secured into the door opening in a wall by any suitable means. For example, the door frame may be adhesively fit to the opening using urethane adhesive sealant, preferably with corona or flame treatment of the HDPE to improve adhesion. The HDPE may be grooved with a router to form an elongate recess in the architrave portions and into which screw fixings may be inserted to secure the frame to a wall opening. The recess may be dovetail in section to retain a flexible cover strip to conceal the screw heads.

BRIEF DESCRIPTION OF THE DRAWINGS

The invention will be described with reference to the following non-limiting embodiment of the invention as illustrated in the drawings and wherein.

DESCRIPTION OF THE EMBODIMENT

In the figures, a 10 mm thick sheet of HDPE forms a door frame blank 10 comprising two uprights and a header. The blank 10 is CNC routed to provide re-entrant grooves having spaced outer edges 12, screw line dovetail grooves 13, door stop peg recesses 14 and edge rebates 15. A door stop portion 16 is retained by T-section key member 17 secured from the back of the blank 10 by screws (not shown).

Figure 1:
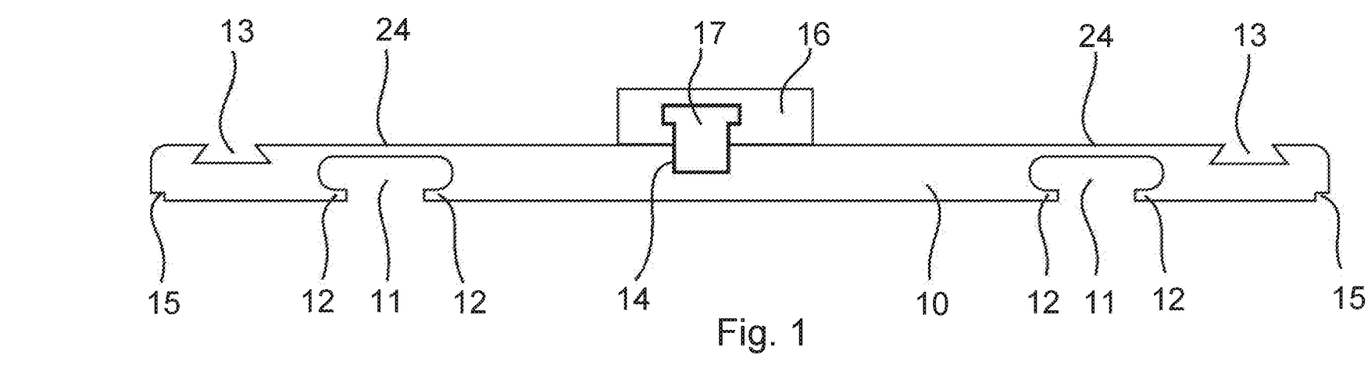
FIG. 1 is a section across a door frame blank for use in a method in accordance with the present invention.
Figure 2:
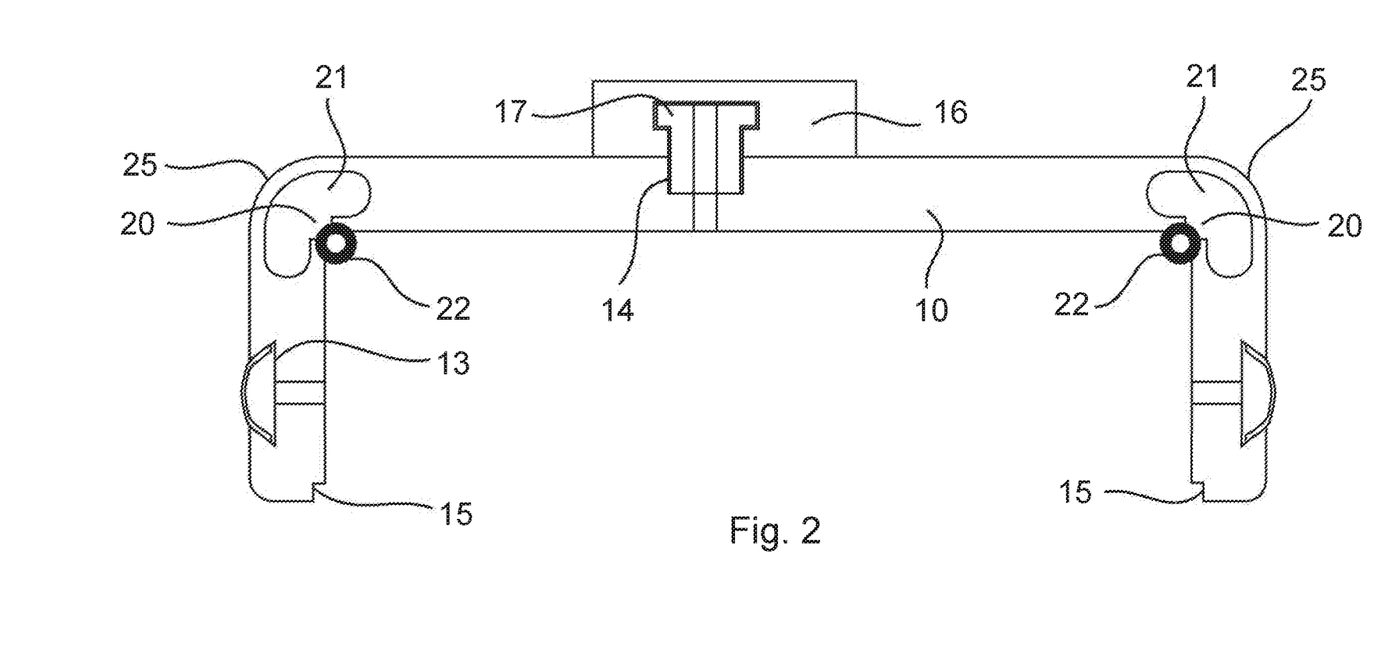
FIG. 2 is the folded and welded door frame section formed from the blank of FIG. 1.

The preformed blanks 10 are subjected to cold bending to form the door frame shape as in FIG. 2. The spaced edges 12 leave a gap 20 in the folded blank, leaving the reentrant grooves 11 forming an elongate chamber 21 having the gap 20 as an ingress point.

Plastic welding uses hot air to melt a 4 mm diameter HDPE weld rod 22 into the gap 20.

The re-entrant grooves 11 leave a 2 mm web 24 of reduced thickness to provide a bending zone. The web 24 when bent forms an outer curved surface at the bend 25 with some crystalline embrittlement of the material. In order to restore the toughness and resilience of the material, heat needs to be applied to "de-stress" or "relax" the HDPE at the bend 25.

Figure 3:
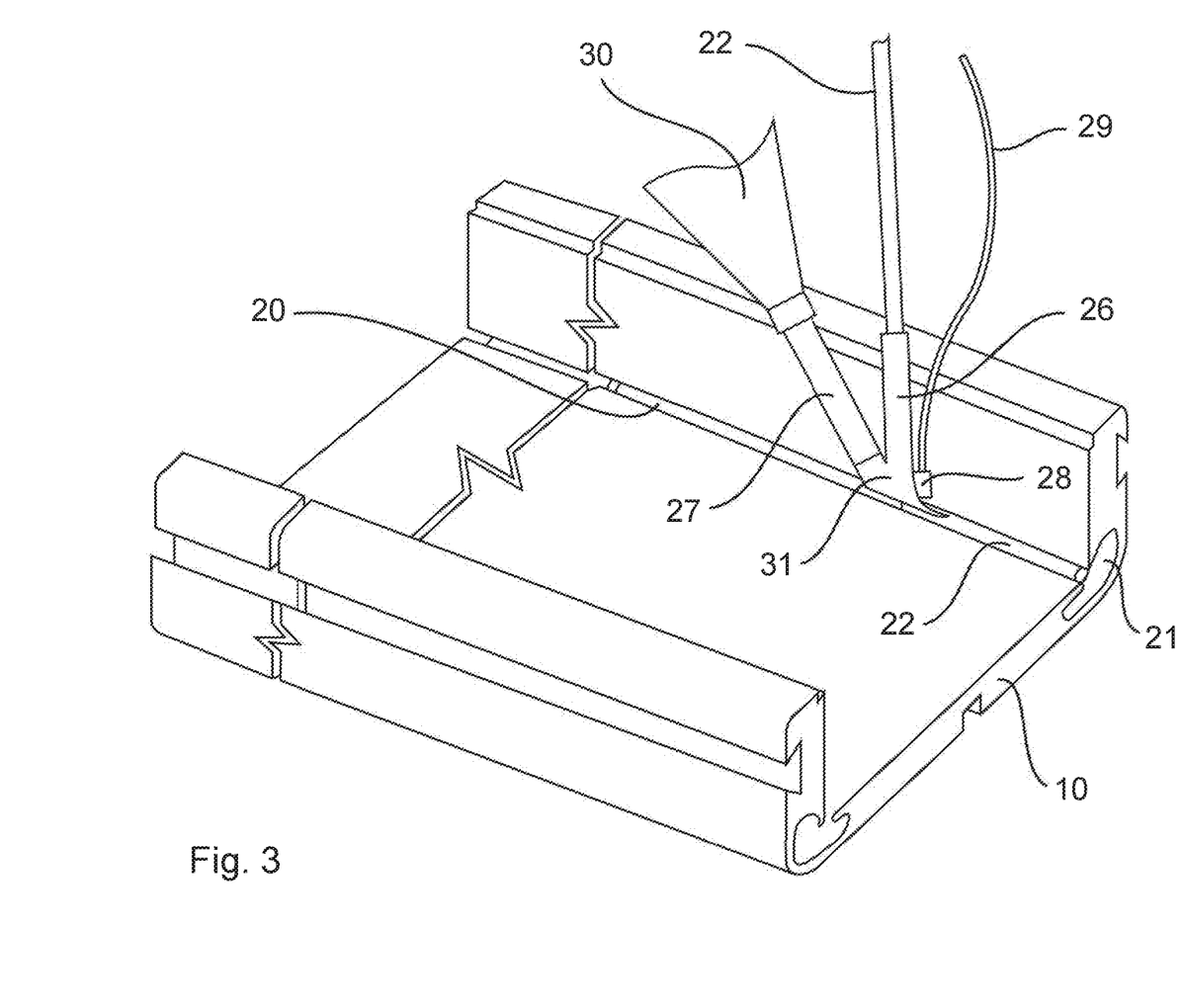
FIG. 3 is an oblique view of the blank of FIG. 1 undergoing the method of the present invention.

As illustrated in FIG. 3, the weld rod 22 is fed into a feeder tube 26 of a metal speed welding attachment 27 heated by a hot air source 30. The speed welding attachment 27 has a welding tip 31 that slides along the forming joint, preheating the HDPE. A thermocouple sensor 28 is connected by wire 29 to a PLC for control of the welding process. Exhaust air passed through the welding tip 31 and into the gap 20, thermo-reforming the bend 25.

The stressed HDPE at the bend 25 is heated to a thermo-reforming temperature of between 171 and 182° C. in order to de-stress it and avoid later cracking. A temperature higher than 182 degrees C. will result in unacceptable surface deformation as the material begins to melt. The elongate chamber 21 provides a pipe effect that channels the hot air through it, adding a degree of controlled uniform heat to the thermo-reforming plastic, distributing even heat.

Figure 4:
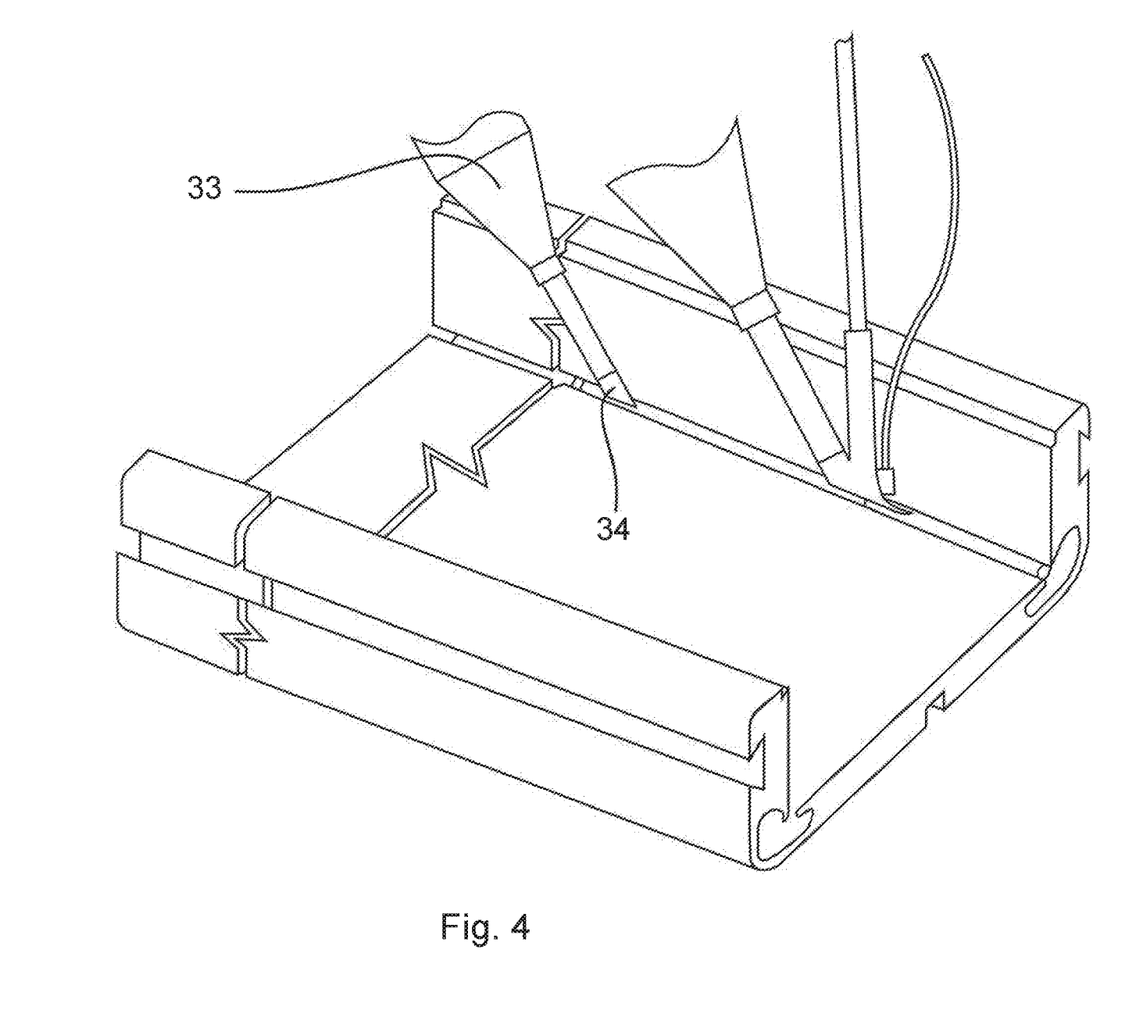
FIGS. 4 and 5 are variations on the general method described by FIG. 3.

In the embodiment of FIG. 4, the stressed HDPE at the bend 25 is preheated by a hot air nozzle assembly 33 having a flattened tip orifice 34 engaged with the gap 20 and moving in advance of the welding tip 31. By this means, the process is not completely reliant on welding tip heating air the thermo-reform the polymer at 25.

Figure 5:
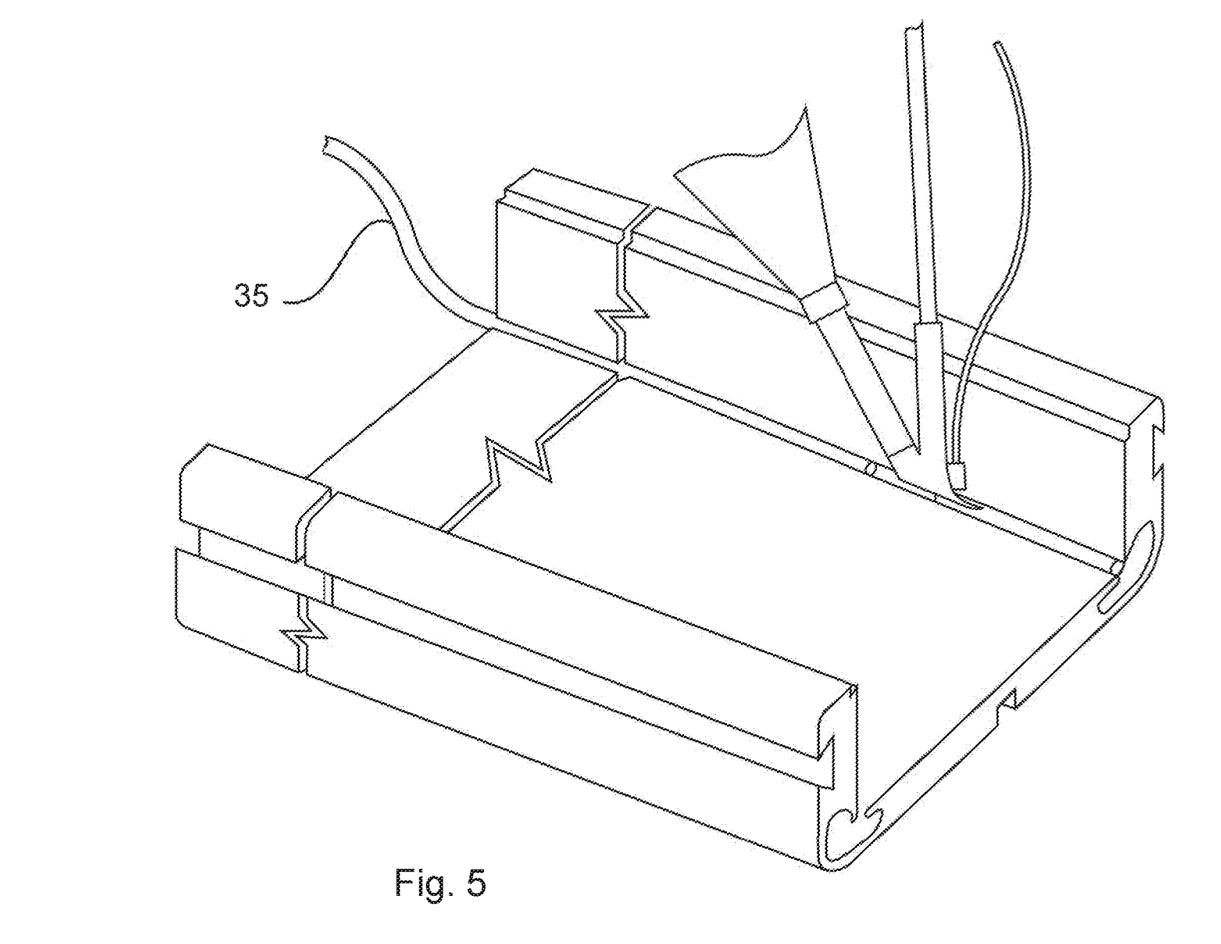

In the embodiment of FIG. 5, the stressed HDPE at the bend 25 is preheated by a hot air feed tube assembly 35 having a round orifice 36 located in the elongate chamber 21 and moving (by progressive withdrawal of the hot air feed tube assembly 35) in advance of the welding tip 31. By this means, the process is again not completely reliant on welding tip heating air the thermo-reform the polymer at 25.

Figure 6:
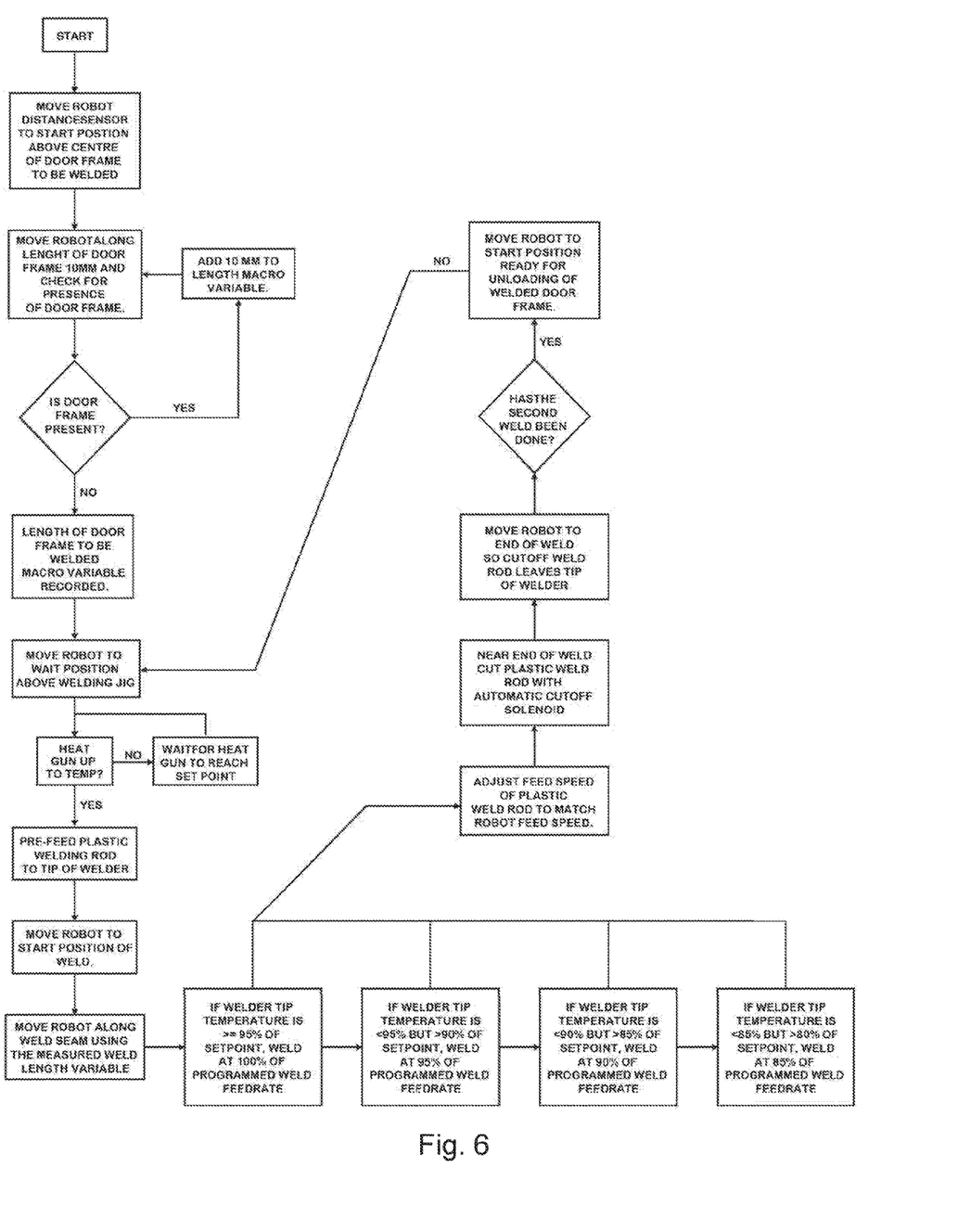
FIG. 6 is a flow chart of operation of a robot-executed method in accordance with the present invention.
Figure 7:
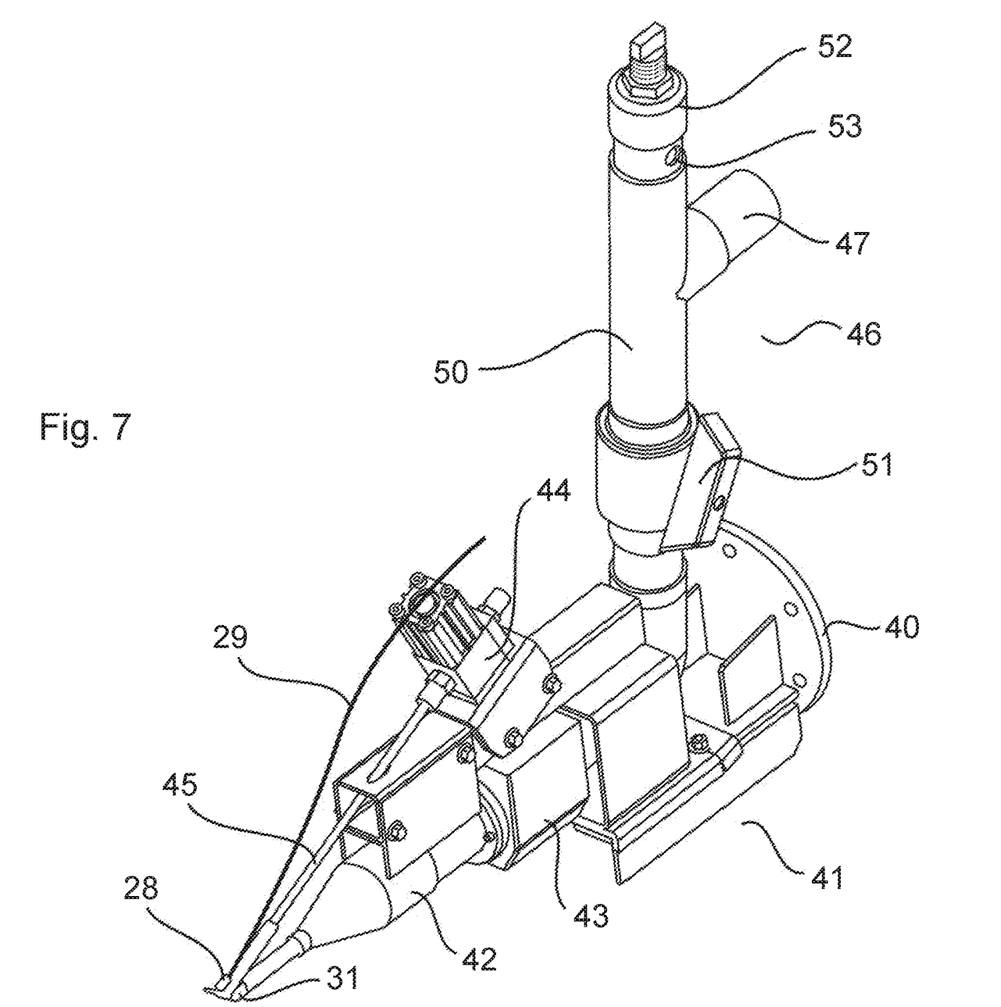
FIG. 7 is a perspective view of part of a robot implementation of the method of FIG. 6.

FIG. 6 is a flow chart of a robot-executed method of the present invention, with the tool end of a typical robot being illustrated in FIG. 7. In FIG. 7, the last stage mounting flange 40 of a 6-axis industrial robot mounts a tool head assembly 41 incorporating a welding assembly 42 mounted to an air heater 43 controlled by a PLC. The welding assembly 42 accepts air from the air heater 43 and delivers it to the welding tip 31, incorporating the thermocouple 28 providing tip temperature data to a PLC via the wire 29.

A polymer rod feeder 44 is controlled by the PLC and delivers polymer welding rod 22 to the welding tip 31 via feed tube 45.

Air is supplied to the air heater 43 by via a monitor assembly 46. The monitor assembly 46 consists of an air inlet 47 delivering pressurized air to a riser tube 50 containing a gravity ball (not shown and in this example a golf ball). The lower end of the riser tube 50 communicates with the air heater 43. The rise tube 50 is manually throttled by a ball valve 51. The upper end of the riser tube 50 is occluded by a microswitch and adjuster assembly 52 providing on-off control signal to the PLC. An airlock eliminator aperture 53 bleeds air from above the golf ball.

In use, air passing through the apparatus is heated and delivered to the tip 31. The gravity ball is responsive to the rate of flow whereby adequate flow maintains the ball in contact with the microswitch and the PLC. Inadequate flow causes the ball to drop away from the microswitch, signalling the PLC to switch off the air heater 34 and the polymer rod feeder 44.

The parameters of welder temperature (hot air temperature), welder travel speed, thickness of HDPE remaining at the bend 25, the size of the gap 20 and the ambient temperature of air and plastic material are all variables that are able to be managed to an acceptable degree with the use of visual indicators during the welding. Robotic technology is used to monitor these variables to use all of the input data to eliminate inconsistency. The robot technology is using continuous laser temperature readings of both the surface temperature of the plastic as well as the welder tip temperature to enable a continuously varying weld speed. The other variables (plastic thickness and weld gap) are controlled as constants in this example.

The gap between plastics to be welded is relevant to the thickness of the plastic to be thermo-reformed. For example, the gap required for 2.0 mm thermo-reformed plastic may be 2.0 mm, the gap for 1.0 mm thermo-reformed plastic is reduced to 1.0 mm, otherwise the heat from the hot air welder (that cannot be lower than 171° C. in order to thermoform and prevent cracking) will unacceptably deform the plastic surface. This ensures that the heat reaching the thermo-reforming plastic surface is of the correct temperature to thermoform, but the volume of hot air is controlled by the gap to suit the plastic thickness.

Visual indicators for successful non-robotic welding are as follows.

(a) The welding tip produces a drag mark on the surface of the plastic weld area adjacent to the weld rod deposit.
(b) The pipe produced by the bend begin to very slightly smoke with a slightly visible wisp of grey smoke produced from the welding process. If the smoke is not present, the weld is likely not hot enough (welder is too cold or hot enough but moving too fast) and the plastic will not thermoform and will later crack. If the smoke is prolific, the welder is too hot or moving too slowly and the plastic surface will deform.

Door frames produced by the present method do not rust. HDPE door frames are food grade and homogeneous, they do not require and in fact, cannot be painted, will not rust, decay, flake or chip. The door frames are fitted after the complete installation of the water proof membrane. The door frame in no way detract from the integrity of the membrane. The door frames are designed to be a fast and effective retrofit solution, reducing retrofit door way installation from four days to several hours by elimination of all plastering and painting. They are able to be fitted with very minimal mess or disruption, reducing the cost of the current method by thousands of dollars.

This joint makes the frames able to be custom made to size instead of injection moulded. Injection moulding require a vast machinery and mould outlay to facilitate every different wall thickness, door size etc. It is calculated that there are approximately 4500 different combinations of wall thickness, door size, lock location etc, making routering or CNC machining of flat sheet the most viable solution.

It will of course be realised that while the above has been given by way of illustrative examples of this invention, all such and other modifications and variations thereto as would be apparent to persons skilled in the art are deemed to fall within the broad scope and ambit of this invention as is set forth in the claims appended hereto.

The invention claimed is:

1. A polymer fabrication method including the steps of:
   providing a sheet polymer blank of selected thickness and of shape selected corresponding to a selected 3-dimensional shape;
   machining at least one re-entrant, elongate groove across a surface of said blank, said elongate groove forming a reduced thickness portion permitting said blank to be folded and having opposed edges that overhang the reduced thickness portion at said surface, and the elongate groove, prior to folding, having an obround cross section adjacent to the reduced thickness portion;
   folding said blank about said groove to form at least a portion of said 3-dimensional shape, said groove forming an elongate chamber adjacent said reduced thickness portion and opening through an elongate gap between said opposed edges;
   hot air welding said opposed edges across said gap with filler rod; and
   heating said reduced thickness portion to a selected thermo-reforming temperature via said chamber.

2. A polymer fabrication method according to claim 1, wherein the polymer is a crystalline polymer selected from HDPE, PP and PET.

3. A polymer fabrication method according to claim 1, wherein said thermo-reforming is effected by any one or more of partial remelting, annealing and recrystallization of the polymer sufficient to reinstate the integrity of the polymer matrix.

4. A polymer fabrication method according to claim 3, wherein the thermo-reforming of the reduced thickness portion comprises heating by means selected from hot air, radiant or contact heating means.

5. A polymer fabrication method according to claim 4, wherein the heating comprises utilizing waste heat from the hot air welding process.

6. A polymer fabrication method according to claim 5, wherein the thermo-reforming process is controlled by calibration against the temperature and speed of the welding process.

7. The polymer fabrication method according to claim 1, wherein the sheet polymer blank is a sheet HDPE blank, and wherein welding exhaust air passes into said chamber and heats said reduced thickness portion.

8. The polymer fabrication method according to claim 7, wherein the HDPE sheet is of density of 0.940 to 0.965 g/cm$^3$.

9. The polymer fabrication method according to claim 7, wherein the depth of the groove is selected having regard to the residual thickness necessary to leave to provide in-use structural strength and resistance to impact damage while being foldable.

10. The polymer fabrication method according to claim 9, wherein the HDPE is 10 mm sheet and is machined to form said groove leaving a residual material thickness of from 1.5 mm to about 3.0 mm.

11. The polymer fabrication method according to claim 7, wherein the groove is formed by a CNC router.

12. The polymer fabrication method according to claim 7, wherein the folding of the blank about the groove to form at least a portion of the 3-dimensional shape is done in a single pass and the shape retained by a jig.

13. The polymer fabrication method according to claim 7, wherein the elongate gap is substantially the same width as said reduced thickness portion.

14. The polymer fabrication method according to claim 13, wherein the gap is less than 6 mm in width.

15. The polymer fabrication method according to claim 7, wherein the hot air welding method is speed welding wherein a metal head fitted on a hot air welding tool has a feed tube for a plastic weld rod, the metal head heats the rod and the substrate, while at the same time the melting weld rod is pressed into position, a consistent bypass of hot air passing into said elongate chamber.

16. The polymer fabrication method according to claim 7, wherein the reduced thickness portion is heated to between 171 and about 182° C.

17. The polymer fabrication method according to claim 7, wherein said hot air welding is performed by a PLC-controlled robotic process responsive to at least a temperature sensor associated with the welding tip.

18. An HDPE fabrication method including the steps of:
    providing a sheet HDPE blank of selected thickness and of shape selected corresponding to a selected 3-dimensional shape;
    machining at least one re-entrant, elongate groove across a surface of said blank, said elongate groove forming a reduced thickness portion permitting said blank to be folded and having opposed edges that overhang the reduced thickness portion at said surface, and the elongate groove, prior to folding, having an obround cross section adjacent to the reduced thickness portion;
    folding said blank about said groove to form at least a portion of said 3-dimensional shape, said groove forming an elongate chamber adjacent said reduced thickness portion and opening through an elongate gap between said opposed edges;
    hot air welding said opposed edges across said gap with filler rod whereby welding exhaust air passes into said chamber and heats said reduced thickness portion to a selected thermo-reforming temperature.

19. An HDPE fabrication method including the steps of:
    providing a sheet HDPE blank of selected thickness and of shape selected corresponding to a selected 3-dimensional shape;
    machining at least one re-entrant, elongate groove across a surface of said blank, said groove forming a reduced thickness portion permitting said blank to be folded and having opposed edges that overhang the reduced thickness portion at said surface;
    folding said blank about said groove to form at least a portion of said 3-dimensional shape, said groove forming an elongate chamber adjacent said reduced thickness portion and opening through an elongate gap between said opposed edges;
    hot air welding said opposed edges across said gap with filler rod whereby welding exhaust air passes into said chamber and heats said reduced thickness portion to a selected thermo-reforming temperature,
    wherein said hot air welding is performed by a PLC-controlled robotic process responsive to at least a temperature sensor associated with the welding tip,
    wherein the PLC-controlled robotic process includes a PLC-controlled polymer and feeder and a PLC-controlled air heating unit such that the welding tip receives polymer welding rod from the PLC controlled polymer rod feeder and the welding tip heating air is supplied to the PLC-controlled air heating unit via an air flow monitor to trigger an on signal from the PLC to the heating element of the air heating unit, and an off signal if air flow drops to de-activate the heating unit and feeder.

20. An HDPE fabrication method according to claim 19, wherein the monitor comprises a substantially vertical tube confining a gravity ball lifted by air pressure in the tube to contact a microswitch switch at the top of the tube for the on signal and the ball falling away from the switch for the off signal.

21. An HDPE fabrication method according to claim 19, wherein the PLC regulates parameters such as one or more of a speed of the rod feeder, speed of welding advance, air heating unit exit temperature and air flow.

22. An HDPE fabrication method according to claim 21, wherein the PLC adjusts the speed of the rod feed via a stepper or servo motor feeder in direct proportion to the weld speed of the robot arm.

* * * * *